United States Patent
Eguchi et al.

(10) Patent No.: US 7,568,389 B2
(45) Date of Patent: *Aug. 4, 2009

(54) LIQUID DETECTING APPARATUS, LIQUID-AMOUNT DETECTING APPARATUS, LIQUID DETECTING METHOD, AND LIQUID-AMOUNT DETECTING METHOD

(75) Inventors: Takeo Eguchi, Kanagawa (JP); Kazuyasu Takenaka, Kanagawa (JP); Takumi Namekawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 217 days.

This patent is subject to a terminal disclaimer.

(21) Appl. No.: 11/599,228

(22) Filed: Nov. 13, 2006

(65) Prior Publication Data

US 2007/0068249 A1    Mar. 29, 2007

Related U.S. Application Data

(63) Continuation of application No. 11/178,791, filed on Jul. 11, 2005, now Pat. No. 7,134,331, which is a continuation of application No. 10/625,120, filed on Jul. 23, 2003, now Pat. No. 6,962,079.

(30) Foreign Application Priority Data

Jul. 24, 2002 (JP) ............................. 2002-215848

(51) Int. Cl.
G01F 23/00 (2006.01)

(52) U.S. Cl. .................. 73/304 R; 73/290 R

(58) Field of Classification Search ............... 73/290 R, 73/304 R
See application file for complete search history.

(56) References Cited

U.S. PATENT DOCUMENTS 2,563,280 A * 8/1951 Sehafer et al. ............ 73/304 R (Continued)

FOREIGN PATENT DOCUMENTS

EP    0 783 968    7/1997

(Continued)

*Primary Examiner*—Hezron Williams
*Assistant Examiner*—Rodney T Frank
(74) *Attorney, Agent, or Firm*—Robert J. Depke; Rockey, Depke & Lyons, LLC

(57) ABSTRACT

A liquid-amount detecting apparatus detects the amount of a liquid in containers. The liquid-amount detecting apparatus includes a liquid detecting circuit and a determining unit. The liquid detecting circuit includes electrode units disposed so as to be in contact with the liquid in the containers, which becomes electrically conductive when in contact with the liquid, an impedance, and an AC-signal source. An AC signal not containing a DC component is input from the AC-signal source to the electrode units through the source impedance, and a signal representing the status of electric connection of the electrode units is output. Furthermore, based on the output signal, a binary signal representing the presence or absence of electrical connection of the electrode units is output. The determining unit determines the presence or absence of the liquid at the electrode units based on the binary signal output from the liquid detecting circuit.

3 Claims, 11 Drawing Sheets

U.S. PATENT DOCUMENTS

| | | | |
|---|---|---|---|
| 4,110,740 A * | 8/1978 | Akita et al. | 340/620 |
| 4,196,625 A * | 4/1980 | Kern | 73/304 R |
| 4,284,951 A * | 8/1981 | Dahl et al. | 324/430 |
| 4,352,159 A * | 9/1982 | Colby | 702/52 |
| 4,355,363 A * | 10/1982 | Colby et al. | 702/52 |
| 4,451,894 A * | 5/1984 | Dougherty et al. | 702/52 |
| 4,676,101 A * | 6/1987 | Baughman | 73/304 C |
| 5,033,300 A * | 7/1991 | Matsuo et al. | 73/304 R |
| 5,775,164 A | 7/1998 | Kishi | |
| 5,988,783 A | 11/1999 | Tajika et al. | |
| 6,631,970 B2 * | 10/2003 | Sato et al. | 347/19 |
| 6,650,128 B2 * | 11/2003 | Sanders | 324/715 |
| 6,918,296 B1 * | 7/2005 | Urquidi et al. | 73/304 R |
| 6,962,079 B2 * | 11/2005 | Eguchi et al. | 73/304 R |
| 7,131,327 B2 * | 11/2006 | Eguchi et al. | 73/304 R |
| 7,131,328 B2 * | 11/2006 | Eguchi et al. | 73/304 R |
| 7,131,329 B2 * | 11/2006 | Eguchi et al. | 73/304 R |
| 7,134,331 B2 * | 11/2006 | Eguchi et al. | 73/304 R |
| 7,134,332 B2 * | 11/2006 | Eguchi et al. | 73/304 R |
| 2003/0155938 A1 * | 8/2003 | Sanders | 324/715 |

FOREIGN PATENT DOCUMENTS

| | | |
|---|---|---|
| JP | 63-305213 | 12/1988 |
| JP | 08-067011 | 3/1996 |
| JP | 09-030005 | 2/1997 |
| JP | 10-166617 | 6/1998 |
| JP | 11-179936 | 7/1999 |

* cited by examiner

LIQUID DETECTING APPARATUS, LIQUID-AMOUNT DETECTING APPARATUS, LIQUID DETECTING METHOD, AND LIQUID-AMOUNT DETECTING METHOD

The subject matter of application Ser. No. 10/625,120 is incorporated herein by reference. The present application is a continuation application of U.S. application Ser. No. 11/178,791 filed on Jul. 11, 2005 now U.S. Pat No. 7,134,331, which is a continuation application of U.S. application Ser. No 10/625,120, filed Jul. 23, 2003 now U.S. Pat. No. 6,962,079, which claims priority to Japanese Patent Application No. JP2002-215848, filed Jul. 24, 2002. The present application claims priority to these previously filed applications.

BACKGROUND OF THE INVENTION

1. Field of the Invention

The present invention relates to a liquid detecting apparatus or a liquid-amount detecting apparatus for detecting a liquid or the amount of a liquid in a container. For example, the present invention relates to an apparatus for detecting the remaining amount of ink in an ink tank of an ink-jet printer.

2. Description of the Related Art

In an ink-jet printer, ink is stored in an ink tank, and the ink is transferred from the ink tank to an ink discharging unit (head) through an ink path, whereby droplets of ink is discharged. In the ink-jet printer, the presence or absence of ink must be detected with a relatively high precision. A first reason for this is that it is difficult to visually determine the remaining amount of ink from the external appearance of the ink tank.

As a second reason, if the ink is discharged to such an extent that the ink is completely used up, ink that serves as "primer" becomes unavailable. That is, air enters the ink path, preventing the ink from being transferred to a nozzle. In that case, ink must be supplied again from the start to allow ink to be discharged, or the ink discharging unit could be degraded. As a method of discharging ink in an ink-jet printer, the thermal method is known, in which ink in an ink cell is rapidly heated by a heating element to discharge droplets of ink. If the heating element generates heat even though ink is not present, the heating element could be damaged. Thus, discharging of ink (printing) must be stopped when the remaining amount of ink reaches a certain level.

Furthermore, as a third reason, when a large-sized print sheet is used, if the remaining amount of ink is not detected precisely, it is possible that ink is used up during printing and printing up to that time becomes vain.

From the viewpoints of safety, economy, etc., described above, it is necessary to detect the remaining amount of ink accurately.

Known method of detecting the remaining amount of ink include (1) mechanical detection, (2) optical detection, (3) detection based on change in electrical resistance, (4) detection based on change in capacitance, and (5) detection based on count of discharged amount.

Examples of (3) detection based on change in electrical resistance include (1) Japanese Unexamined Patent Application Publication No. 6-226990 (Patent Document 1), (2) Japanese Patent Publication No. 2772015 (Patent Document 2), (3) Japanese Patent Publication No. 2798948 (Patent Document 3), and (4) Japanese Unexamined Patent Application Publication No. 11-179936 (Patent Document 4).

Of the examples of detection based on change in electrical resistance, according to the methods disclosed in Patent Documents 1 to 3, a pair of electrodes is provided in a liquid, and a current is fed to the electrodes from a DC power source via a resistor having a high value of resistance. The voltage applied to the pair of electrodes changes depending on the presence or absence of the liquid between the pair of electrodes. According to the method disclosed in Patent Document 4, an alternating current is used for detection of a liquid.

The related art described above, however, has had the following problems.

First, when a direct current flows through a liquid as in the art disclosed in Patent Documents 1 to 3, an electrolysis occurs depending on the type of the electrodes and the components of the liquid. Thus, the surfaces of the electrodes are likely to change, and metallic ions are eluted into the liquid, possibly causing change in the characteristics of the liquid (ink). Furthermore, according to the methods that use a direct current, as will be described later in relation to embodiments of the present invention, the impedance of the circuit system tends to be high, which makes a detection at high speed difficult.

According to the art disclosed in Patent Document 3, in order to overcome this drawback, the direction of a current that flows through electrodes is reversed at a cycle of measurement period. According to this method, however, a direct current is used for measurement itself, and ions generated by the measurement with the direct current are eliminated by a flow of a DC current in the reverse direction for the same length of time. Therefore, the speed of measurement is slow.

According to the art disclosed in Patent Document 4, since an alternating current is used, the problem of the electrolysis does not occur. However, liquid is detected in an analog manner, i.e., by detecting change in the amount of the liquid based on change in capacitance. Thus, levels detected are unstable, and results of detection are not reliable.

SUMMARY OF THE INVENTION

Accordingly, a main objective of the present invention is to prevent electrolysis (ionization) of liquid from occurring and not to change in characteristics of the liquid while allowing reliable detection.

The present invention, in one aspect thereof, provides a liquid detecting apparatus for detecting a liquid contained in at least one container, the liquid detecting apparatus including a liquid detecting circuit including an electrode unit formed, at least, by a pair of electrodes that is to be disposed in contact partially with the liquid in the container, the pair of electrodes being electrically connected to each other when the pair of electrodes is in contact with the liquid; an impedance; and an alternating-current signal-source; wherein the liquid detecting circuit inputs an alternating-current signal that does not contain a direct-current component to the electrode unit via a certain value of impedance, outputs a signal representing status of electrical connection between the pair of electrodes, and outputs a binary signal representing the presence or absence of electrical connection between the pair of electrodes based on the output signal; and a determining unit for determining the presence or absence of the liquid at the electrode unit based on the binary signal output from the liquid detecting circuit.

The present invention, in another aspect thereof, provides a liquid-amount detecting apparatus for detecting the amount of a liquid contained in at least one container, the liquid detecting apparatus including a liquid detecting circuit including an electrode unit formed by a pair of electrodes that is to be disposed in contact at least partially with the liquid in the container, the pair of electrodes being electrically connected to each other when the pair of electrodes is in contact with the liquid; an impedance; and an alternating-current signal source; wherein the liquid detecting circuit inputs an alternating-current signal that does not contain a direct-current component to the electrode unit through a certain value of impedance, outputs a signal representing status of electrical connection between the pair of electrodes, and outputs a binary signal representing the presence or absence of electrical connection between the pair of electrodes based on the output signal; and determining unit for determining the presence or absence of the liquid at the electrode unit based on the binary signal output from the liquid detecting circuit.

The present invention, in another aspect thereof, provides a liquid detecting method for detecting a liquid contained in at least one container, wherein an alternating-current signal that does not contain a direct-current component is input from an alternating-current signal source to an electrode unit via a certain value of impedance, the electrode unit being formed by a pair of electrodes that is to be disposed in contact at least partially with the liquid in the container, the pair of electrodes being electrically connected to each other when the pair of electrodes is in contact with the liquid, wherein a signal representing status of electrical connection between the pair of electrodes is output, wherein a binary signal representing the presence or absence of electrical connection between the pair of electrodes is output based on the output signal, and wherein the presence or absence of the liquid at the electrode unit is determined based on the binary signal.

The present invention, in another aspect thereof, provides a liquid-amount detecting method for detecting the amount of a liquid contained in at least one container, wherein an alternating-current signal that does not contain a direct-current component is input from an alternating-current signal source to an electrode unit through a certain value of impedance, the electrode unit being formed by a pair of electrodes that is to be disposed in contact at least partially with the liquid in the container, the pair of electrodes being electrically connected to each other when the pair of electrodes is in contact with the liquid, wherein a signal representing status of electrical connection between the pair of electrodes is output, wherein a binary signal representing the presence or absence of electrical connection between the pair of electrodes is output based on the output signal, and wherein the presence or absence of the liquid at the electrode unit is determined based on the binary signal.

According to the present invention, an alternating-current signal that does not contain a direct-current component is input from the alternating-current signal source to the electrode unit through a certain value of impedance.

When the alternating-current signal is input to the electrode unit, a signal representing the status of electric connection between the pair of electrodes of the electrode unit is output, and a binary signal representing the presence or absence of electric connection between the pair of electrodes is output based on the output signal. The presence or absence of liquid at the electrode unit is determined based on the binary signal.

Thus, since an alternating-current signal that does not contain a direct-current component is input to the electrode unit, a direct current does not flow through the liquid, avoiding change in the characteristics of the liquid. Furthermore, thanks to a low conduction impedance, detection speed can be increased.

Furthermore, since the presence or absence of liquid is determined by outputting a binary signal, digital processing is allowed, serving to improve the reliability of detection.

DESCRIPTION OF THE PREFERRED EMBODIMENTS

Now, embodiments of the present invention will be described with reference to the accompanying drawings.

According to the present invention, a pair of electrodes is disposed in a liquid, and the presence or absence of the liquid is determined based on a current that flows between the pair of electrodes. The current that is used herein is an alternating current, not a direct current. The reasons for this will be described below.

When the electrical resistance between electrodes that are in contact with a liquid is measured, for example, by a circuit tester, the electrical resistance does not depend much on the distance between the electrodes, and the electrical resistance is large at first, and becomes lower as time elapses. This phenomenon can be explained by increase in ions due to progress of electrolysis that is caused by the measurement itself with a direct current between the electrodes, although the phenomenon depends considerably on the material of the electrodes, the conditions of surface treatment, the area of surfaces in contact with the liquid, the characteristics of the liquid, etc. Now, let the distance between the electrodes be denoted as L and the cross sectional area of the electrodes through which the current flows be denoted as A. Then, L/A is known to be a constant value (=K) in a given container. The resistance R of the liquid between the electrodes is R=K/k, where k denotes the conductivity of the liquid.

Figure 1:
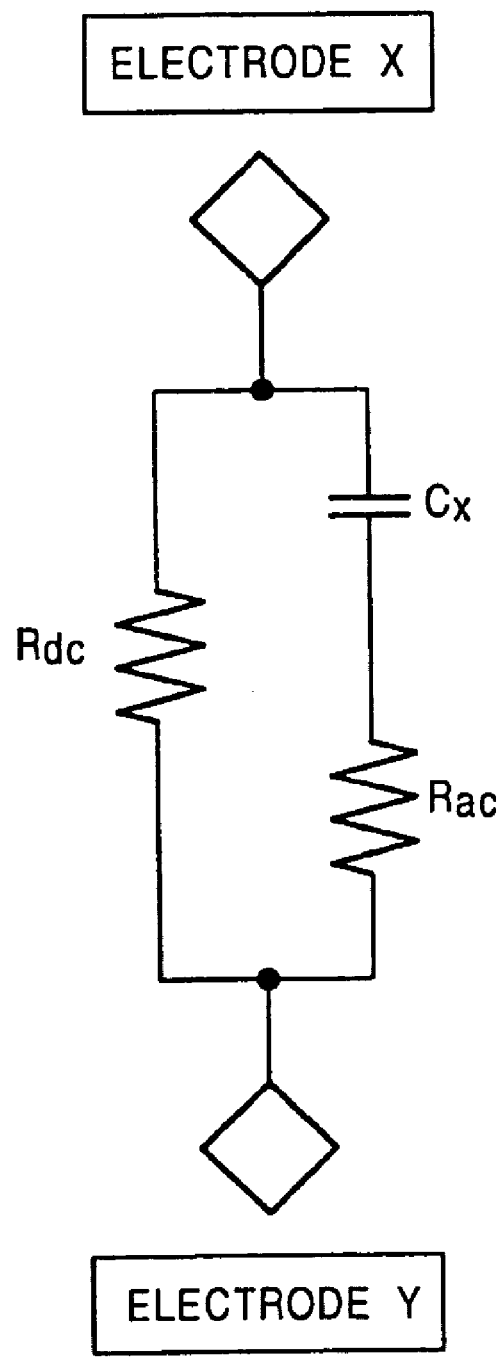
FIG. 1 is a diagram showing an equivalent impedance circuit.

Considering the impedance (Zx) between the electrodes based on what has been described above, an equivalent impedance circuit shown in FIG. 1 is considered as appropriate. In FIG. 1, a resistor Rdc represents the resistance of the liquid as measured with a direct current over a short period. A capacitor Cx represents the electrostatic capacitance of the liquid. A resistor Rac represents the resistance of the liquid as measured with an alternating current. Since values of measurement differ between measurement with a direct current and measurement with an alternating current, the capacitor Cx is connected in series with the resistor Rac.

Figure 2:
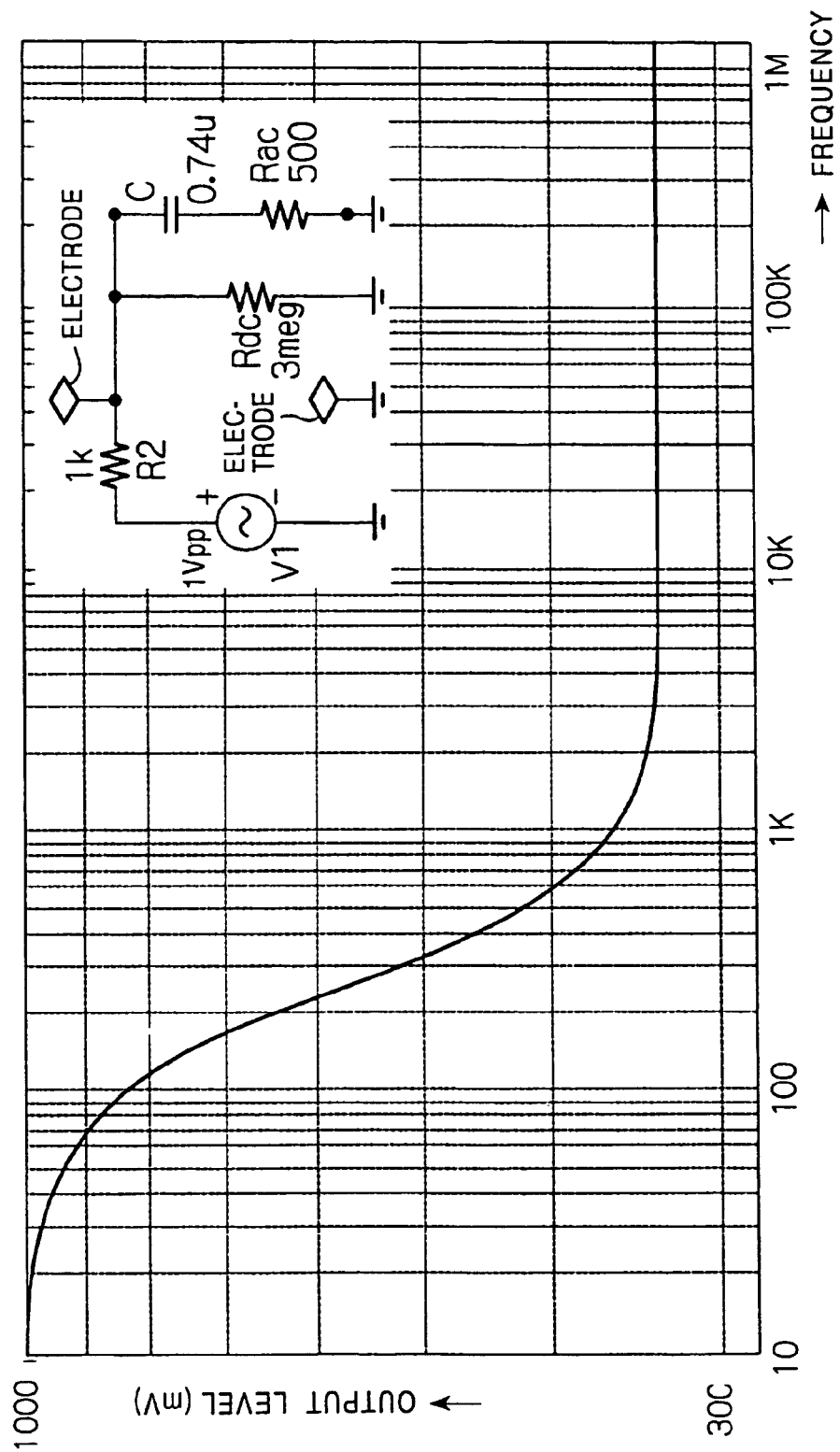
FIG. 2 is a diagram showing the results of a simulation of the equivalent impedance circuit shown in FIG. 1.

FIG. 2 is a diagram showing the results of a calculation of the equivalent impedance circuit shown in FIG. 1. In the calculation, ink for an ink-jet printer was chosen as the liquid.

In FIG. 2, the horizontal axis represents the frequency (Hz), and the vertical axis represents the output voltage (mV) between the electrodes of the equivalent circuit shown in FIG. 1.

Furthermore, in the circuit shown in FIG. 2, a signal source V1 is an AC-signal source, and a resistor R2 is a signal-source resistor.

As is apparent from FIG. 2, under the conditions of the liquid and the electrodes in the calculation, at frequencies not higher than 100 Hz, the resistance as measured with an alternating current is several MΩ, which is substantially equivalent to the resistance as measured with a direct current; however, at frequencies from 100 Hz to 1kHz, the resistance dramatically decreases (3 MΩ to 500 Ω), and even decreases to approximately 1/10,000 depending on the conditions of the liquid and the electrodes.

This indicates the following:

(1) In detecting a liquid using the electrical resistance (or conductivity) of the liquid as a switch, when a direct current is used, a high conduction resistance is inevitable in a conductive state (when the liquid is present between the electrodes); however, with an alternating current having a frequency of several kHz or higher, the overall impedance can be reduced by three or four orders of magnitude.

(2) According to the calculation described above, the resistance of the liquid as measured with an alternating current is a low/constant value over a considerably wide band in frequency. Thus, when an AC signal that falls in this frequency band is applied to the switch from the signal source via the series resistor, the switch exhibits a high open/short-circuit ratio.

(3) It is possible to prevent an effect of stray capacitance and/or cross-talks, because the circuit impedance is low. In particular, this tendency is reinforced if an output value of detection is binary.

Figure 3A:
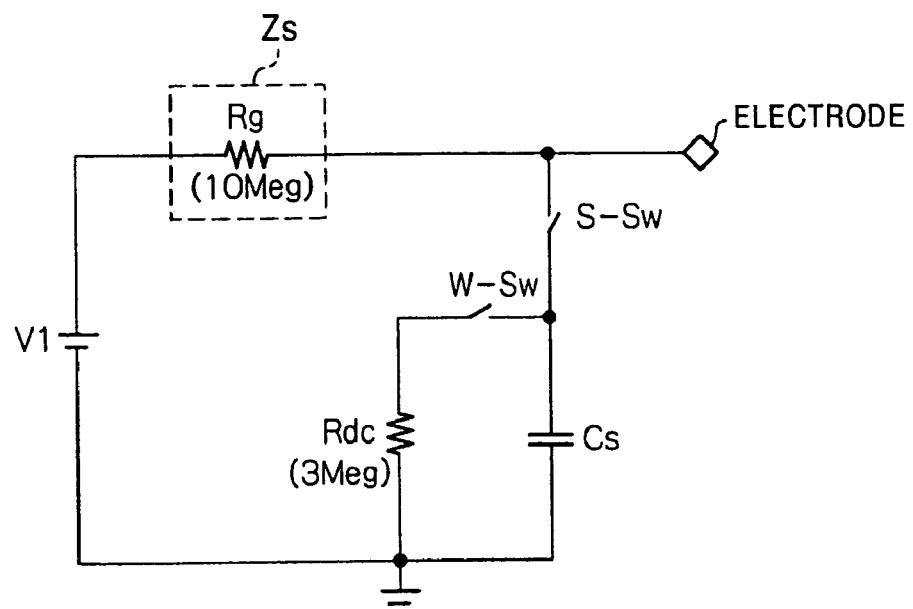
FIGS. 3A and 3B are diagrams specifically showing the difference in circuit impedance due to difference between DC detection and AC detection.
Figure 3B:
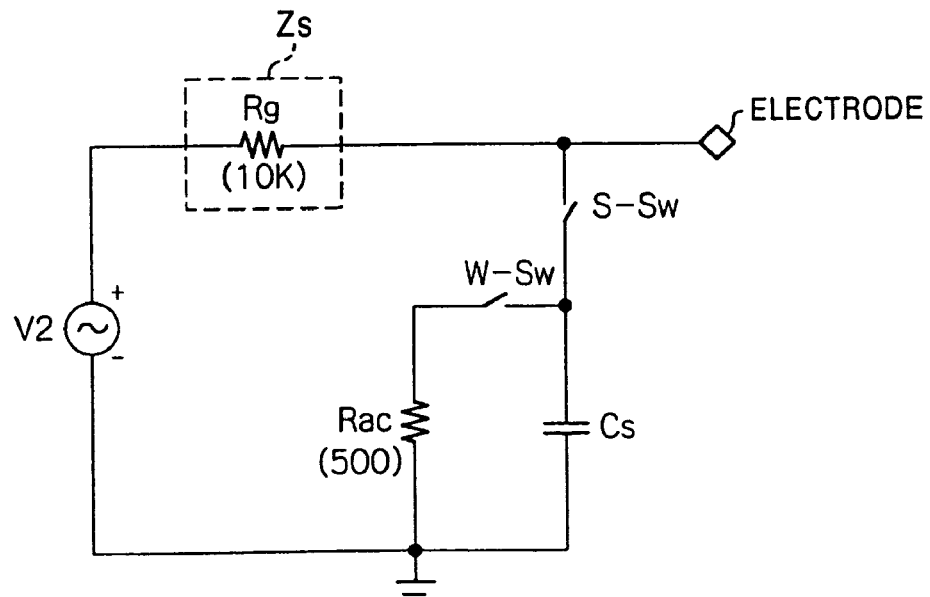

FIGS. 3A and 3B are diagrams specifically showing the difference in circuit impedance between detection with a direct current and that with an alternating current. FIG. 3A shows a model of detection with a direct current, and FIG. 3B shows a model of detection with an alternating current. In FIGS. 3A and 3B, V1 and V2 denote signal sources, respectively, and a resistor Rg is a signal-source resistor. Cs denotes a stray capacitance between the electrodes. S-Sw denotes an electrode selecting-switch, and W-Sw denotes a switch that operates based on conduction through the liquid.

The principal difference between DC detection and AC detection is that only one threshold (whether a certain level is exceeded or not) is used in DC detection whereas two thresholds centered at 0 are usually used in AC detection.

In DC detection, it is required that a current that flows between the electrodes be minimized in order to alleviate the problem of ionization.

For this reason, the values of the signal-source resistor Rg and the inter-electrode resistor Rdc must be very large, as in the DC detection model shown in FIG. 3A. Thus, the effect of the stray capacitance Cs attributable to wiring extending from the signal-source resistor Rg to the electrodes and the electrodes themselves becomes larger.

In the example shown in FIG. 3, the value of the signal-source resistor Rg differs by three orders of magnitude between DC detection and AC detection. This difference leads to a difference in time that is taken before the conditions of the electrodes stabilize and measurement can be started.

For example, in the case of DC detection, assuming that the stray capacitance Cs is 5 pF, Tdc is a large value on the order of 50 μsec. Thus, a single detecting circuit suffices if the number of electrodes is small (e.g., if a rough detection suffices or if the number of containers to be monitored is small) or if a slow cycle of overall detecting operation is acceptable.

However, for example, in the case of an ink-jet printer, the remaining amounts of ink of four to seven colors in different containers must be detected at a high speed and with a high precision, and the distances between the electrodes and the containers tend to be long. In that case, it is possible that a detection circuit is required for each color and a single detecting circuit does not suffice, or the circuit configuration becomes complex.

Furthermore, in DC detection, measurement of a peak value is critical in order to check to what extent a voltage applied to the electrodes rises in a given time. Thus, a peak detector is usually used. In the peak detection, in principle, a value detected must be held until the value is output as valid data, and the value must be cleared before a next measurement takes place. That is, in DC detection, in addition to a rise time, an extra time is taken in measurement due to an analog delay of the stray capacitance and clearing of a previous value of the peak detector. Thus, the overall measurement takes a longer time.

On the other hand, in AC detection, since the original circuit impedance is lowered by the conductivity of the liquid, the time taken until convergence to a peak value is much shorter than in the DC detection, and timing for detecting a peak can be precisely predicted based on a signal that is given.

For example, the level of a sine wave becomes highest at 90 degrees, and the level of a rectangular wave (with no DC) that has passed through a first-order integration circuit shows highest positive value or negative value just before the polarity of the wave changes.

From what has been described above, in detecting a liquid, use of an alternating current is advantageous than use of a direct current, so that an alternating current is used in the present invention.

Now, liquid-amount detecting apparatuses according to embodiments of the present invention will be described.

First Embodiment

Figure 4:
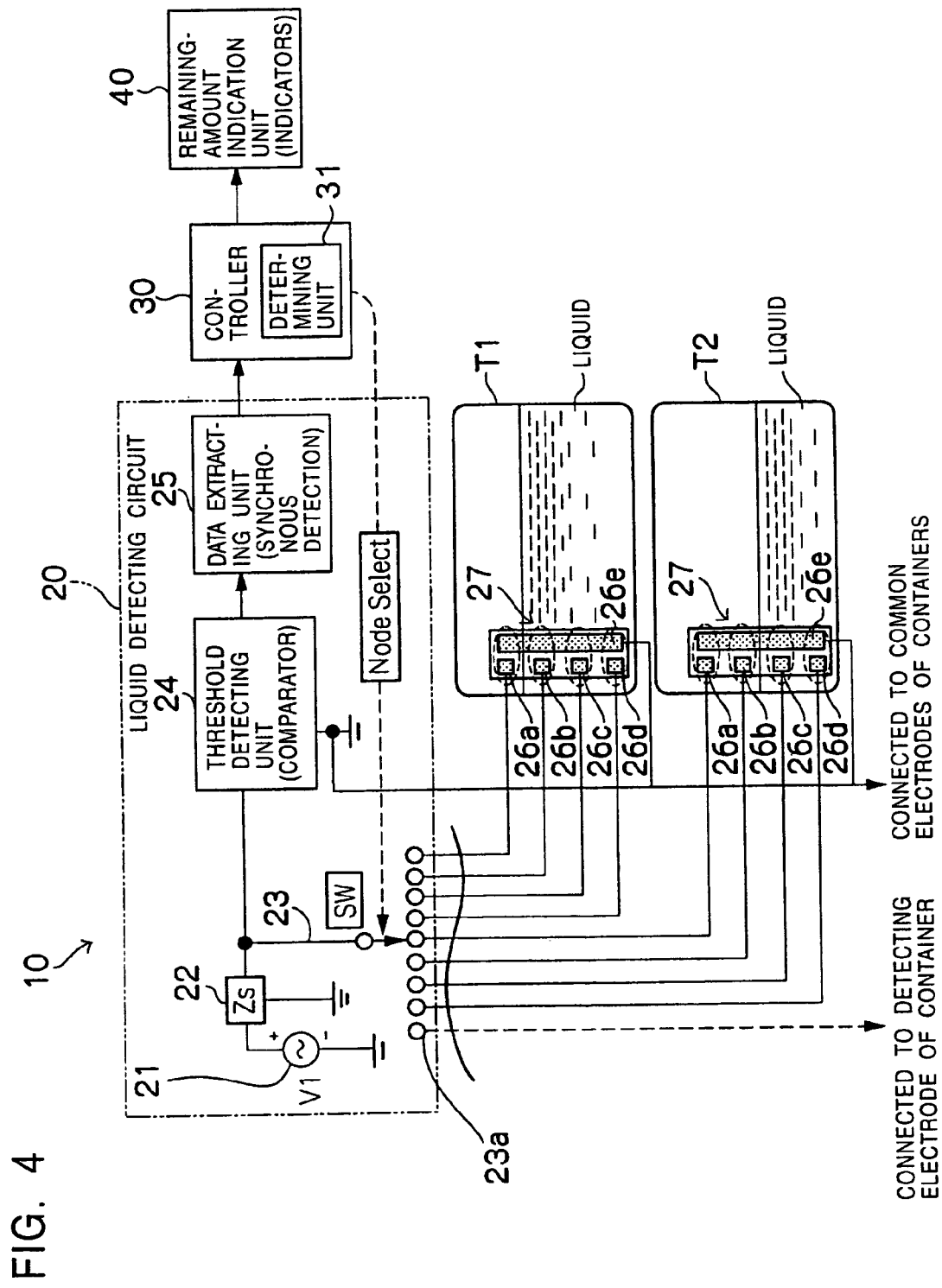
FIG. 4 is a diagram showing the construction of a liquid-amount detecting apparatus according to an embodiment of the present invention.

FIG. 4 is a diagram showing the construction of a liquid-amount detecting apparatus 10 according to a first embodiment of the present invention. As shown in FIG. 4, a conductive liquid that is to be detected by the liquid-amount detecting apparatus 10 is contained in containers T (T1 and T2).

For example, if the liquid-amount detecting apparatus 10 is used in an ink-jet printer, the containers T are ink tanks, and the liquid in the containers T is ink that is used in the ink-jet printer. In the case of a color ink-jet printer that uses ink of a plurality of colors, a container T (ink tank) is provided for each of the colors.

The liquid-amount detecting apparatus 10 according to this embodiment includes a liquid detecting circuit 20, a controller 30, and a remaining-amount indication unit 40.

The liquid detecting circuit 20 includes an AC-signal source (V1) 21, an impedance (Zs) 22, a switch (SW) 23, a threshold detecting unit 24, a data extracting unit 25, and a detector substrate 27 having electrode units 26 (26a to 26e). A specific circuit configuration of the liquid detecting circuit 20 will be described later.

An AC signal generated by the AC-signal source 21 passes through the impedance 22 (The impedance 22 is a source impedance to form an attenuator with the contact resistance.), whereby a DC component thereof is removed, and the resulting AC signal not containing the DC component is fed to the electrode units 26. A sufficient potential difference is generated depending on whether the electrode units 26 are in contact with the liquid.

The switch 23 is controlled so that the AC signal fed from the AC signal-source 21 via the impedance 22 will be input to a selected one of the electrode units 26.

The electrode units 26 are formed by paired electrodes 26a to 26e that are disposed so as to be in contact at least partially with the liquid in the container T. When in contact with the liquid, the paired electrodes 26a to 26e becomes electrically conductive. In this embodiment, the electrode units 26 are provided on the detector substrate 27, and the detector substrate 27 is disposed inside the container T.

In this embodiment, the electrode units 26 are disposed inside the container T, and parts of the liquid-amount detecting apparatus 10 other than the electrode units 26 are disposed outside the container T.

In this embodiment, four pairs of electrodes (26a to 26d with 26e) are provided in one container T (each electrode pair is enclosed in a dotted ellipse in FIG. 4). The electrode pairs are formed by detecting electrodes 26a to 26d and a common electrode 26e. The detecting electrode 26a and the common electrode 26e, the detecting electrode 26b and the common electrode 26e, the detecting electrode 26c and the common electrode 26e, and the detecting electrode 26d and the common electrode 26e are disposed in proximity to each other, forming electrode pairs.

The detecting electrodes 26a to 26d are disposed in parallel at a regular interval in the vertical direction. When the liquid in the container T is decreased, the surface of the liquid shifts from upper to lower as viewed in FIG. 4. That is, the liquid surface becomes lower in the vertical direction when the amount of the liquid decreases.

The detecting electrode 26a is disposed at an uppermost position among the detecting electrodes 26a to 26d. This is a position that comes into contact with the liquid in the container T when the container T is full. The detecting electrode 26 is disposed in the proximity of the bottom surface of the container T.

Furthermore, one common electrode 26e is provided on one detector substrate 27, and the single common electrode 26e is associated with all the four detecting electrodes 26a to 26d. The common electrode 26e is connected to the ground (GND). (The common electrode 26e should be connected to a common connection with a certain potential or a ground. But, grounding is not needed as long as a flow of a direct current is prevented; however, the common electrode 26e is grounded since the ground is usually used as a reference of potential at the threshold detecting unit 24.)

All the detecting electrodes 26a to 26d and the common electrode 26e are formed so as to have substantially the same surface area, shape, etc., so that their impedance characteristics can be nearly equal. This is because if impedance characteristics differ among the electrode units 26, a range for detecting correct status of liquid becomes narrower (Detections are made by a single circuit.).

Although two containers T1 and T2 are shown in FIG. 4, the number of containers T is arbitrary. When more containers T are provided, the detector substrate 27 described earlier is provided for each additional container T, and put additional nodes 23a of the switch 23, associated with the detecting electrodes 26a to 26d for the container T. Furthermore, the common electrode 26e for the container T added is connected to a line to which the common electrodes 26e for the containers T1 and T2 are connected, and is thereby grounded.

The threshold detecting unit 24 outputs a signal representing the status of electric connection between each of the pairs of electrodes 26a to 26d and 26e.

The data extracting unit 25 outputs a binary signal representing the presence or absence-of electric connection between each of the pairs of electrodes 26a to 26d and 26e, based on the signal output from the threshold detecting unit 24.

The controller 30 has a CPU and a memory (storage device), and it includes a determining unit 31 for determining the presence or absence of the liquid at the electrode units 26 based on the binary signal output from the liquid detecting circuit 20. Furthermore, the controller 30 is capable of controlling switching of the nodes 23a of the switch 23 (node-select function).

The remaining-amount indication unit 40 displays the remaining amount of the liquid in the container T in steps, based on the result of determination by the determining unit 31 of the controller 30. In this embodiment, the remaining amount is represented in five steps.

An AC signal output from the AC-signal source 21 passes through the impedance 22, whereby a DC component in the AC signal is removed. The resulting AC signal is fed to the switch 23.

The switch 23 electrically connects the AC-signal source 21 to one of the detecting electrodes 26a to 26d. That is, the switch 23 forwards the AC signal having passed through the impedance 22 to a selected one of the detecting electrodes 26a to 26d.

When the liquid is present between each of the pairs of electrodes 26a to 26d and 26e, the detecting electrodes 26a to 26d are electrically connected to the common electrode 26e. Thus, a current flows between the detecting electrodes 26a to 26d and the common electrode 26e, and is forwarded to the ground. Accordingly, the signal input to the threshold detecting unit 24 exhibits no significant change in voltage (Since the signal from V1 is sufficiently attenuated.). On the other hand, when the liquid is not present between each of the pairs of electrodes 26a to 26d and 26e, the detecting electrodes 26a to 26d are virtually open circuited. Thus, no significant current flows between the detecting electrodes 26a to 26d and the common electrode 26e. Accordingly, the signal input to the threshold detecting unit 24 exhibits nearly the same level as that of V1:21.

When the signal described above is input to the threshold detecting unit 24, a threshold detection is performed, and an output value of the detection is input to the data extracting unit 25. The data extracting unit 25 carries out a synchronous detection. The data extracting unit 25 receives a clock signal for detection from the AC-signal source 21, the clock signal being controlled so as to be synchronized with the signal input from the threshold detecting unit 24. The clock signal and the AC signal are originally the same signal generated by the AC-signal source 21 with this embodiment, so that the cycles of these signals can be synchronized with each other. Since the signals are synchronous with each other, measurement can be speeded up by a use of the synchronous detection. Obviously, the clock signal may be generated separately from the AC signal by another signal source. In that case, synchronous detection is facilitated by synchronizing the two signals, achieving the same effect as in the case where the clock signal and the AC signal are the same signal generated by the same signal source.

The data extracting unit 25 outputs a binary signal representing the presence or absence of electric connection between each of the pairs of electrodes 26a to 26d and 26e. The determining unit 31 receives the binary signals, and determines the presence or absence of the liquid at the electrode units 26 based on a combination of the binary signals.

Furthermore, a signal representing the result of determination by the determining unit 31 is input to the remaining-amount indication unit 40. The remaining-amount indication unit 40 includes, for example, a display, which displays the remaining amount of the liquid in each container T in five steps. For example, if the liquid is detected by all the four electrode units 26 as to the remaining amount of liquid in one container T, "4" is displayed. If the liquid is detected by the lower three electrode units 26 but not by the uppermost electrode unit 26 (the detecting electrode 26a and the common electrode 26e), "3" is displayed. Similarly, if the liquid is detected by none of the four electrode units 26, "0" is displayed.

Figure 5:
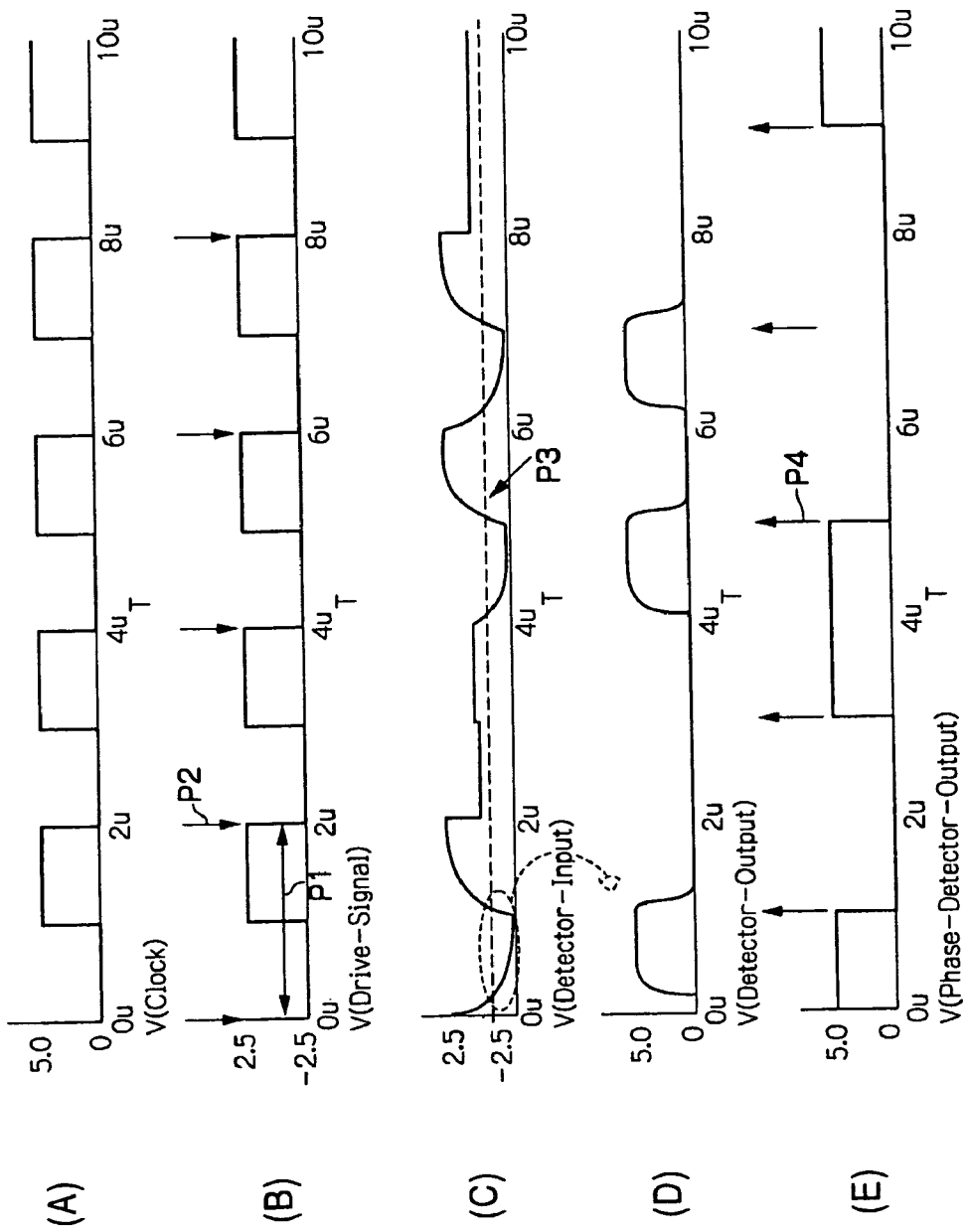
FIG. 5 is a waveform chart for explaining a detecting operation according to a first embodiment.

FIG. 5 is a waveform chart for explaining a detecting operation in this embodiment. The detecting operation shown in FIG. 5 is only an example for illustrating the detecting operation, and not related to the status of the electrode units 26 and the amount of ink in the containers T shown in FIG. 4. That is, for the purpose of explanation, the detecting operation shown in FIG. 5 is an example where status changes as "ink present", "ink absent", "ink present", and "ink absent".

In FIG. 5, part (A) is a waveform chart of an AC signal output from the AC-signal source 21. The AC signal is a rectangular wave having a period of 2 μsec and an amplitude of +5.0 V to 0 V.

Part (B) is a waveform chart of the AC signal fed from the AC-signal source via the impedance 22, with a DC component having been removed therefrom, and the amplitude thereof ranges from +2.5 V to −2.5 V.

As indicated by P1 in part (B), the connection between the switch 23 and the nodes 23a is switched at a cycle of the period of the AC signal (2 μsec). More specifically, the connection between the switch 23 and the nodes 23a is switched at the timing of a falling edge of the rectangular wave, indicated by an arrow P2.

Thus, during the first period of the AC signal (0 to 2 μsec), the switch 23 is connected to a node 23a associated with the detecting electrode 26a for the container T1. Then, at the timing of 2 μsec, the switch 23 is switched to a node 23a associated with the detecting electrode 26b for the container T1. Thus, in the second period (2 to 4 μsec), the AC signal from the AC-signal source 21 is fed to the detecting electrode 26b. Thus, connection with the electrode units 26 can be efficiently switched by controlling switching of the switch 23 in synchronization with the AC signal from the AC-signal source 21.

Furthermore, without limitation to detection of the liquid in a single container T, by switching connection with the electrode units 26 sequentially for all the containers T1, T2, ..., the single liquid detecting circuit 20 can be connected, by time division, to the electrode units 26 of all the containers T.

In FIG. 5, part (C) is a waveform chart showing signals input from the electrode units 26 to the threshold detecting unit 24. The waveform in the first period of 0 to 2 μsec represents the status of electric connection between the detecting electrode 26a and the common electrode 26e for the container T1. The waveform in the next period of 2 to 4 μsec represents the status of electric connection between the detecting electrode 26b and the common electrode 26e for the container T.

The signals input from the electrode units 26 are input to the threshold detecting unit 24, where a threshold detection is performed.

Part (D) is a waveform chart showing a signal output from the threshold detecting unit 24. In this example, a threshold P3 (substantially −1 V in this example) is set in the negative side to output the status of signal attenuation at the electrode units 26. That is, when a value input from the electrode units 26, which is in a range of +2.5 V to −2.5 V, becomes more negative than the threshold value P3, as enclosed in a dotted ellipse in part (C), an inverted value is output.

Part (E) is a waveform chart showing a signal output from the data extracting unit 25. Referring to the waveform chart in part (D), synchronous detection is performed based on the cycle of the clock signal, and a binary signal representing whether the voltage is approximately +5 V is output. In the example shown in FIG. 5, detection is performed at the timings of 1, 3, 5, ... μsec, as indicated by an arrow P4. For example, detection is performed at 1 μsec in the first period from 0 to 2 μsec. In the waveform chart shown in part (D), the signal has a voltage of approximately +5 V, so that a signal representing "voltage present" is output. This signal is maintained until the next detection.

The next detection is performed at 3 μsec. At this time, the signal in the waveform chart shown in part (D) does not have a voltage of approximately +5 V, so that a signal representing "voltage absent" is output. Similarly to the above case, this signal is maintained until 5 μsec, which is the timing of the next detection. By performing detection in synchronization with the clock signal as described above, (every) detection can be performed at a stable timing.

Figure 6:
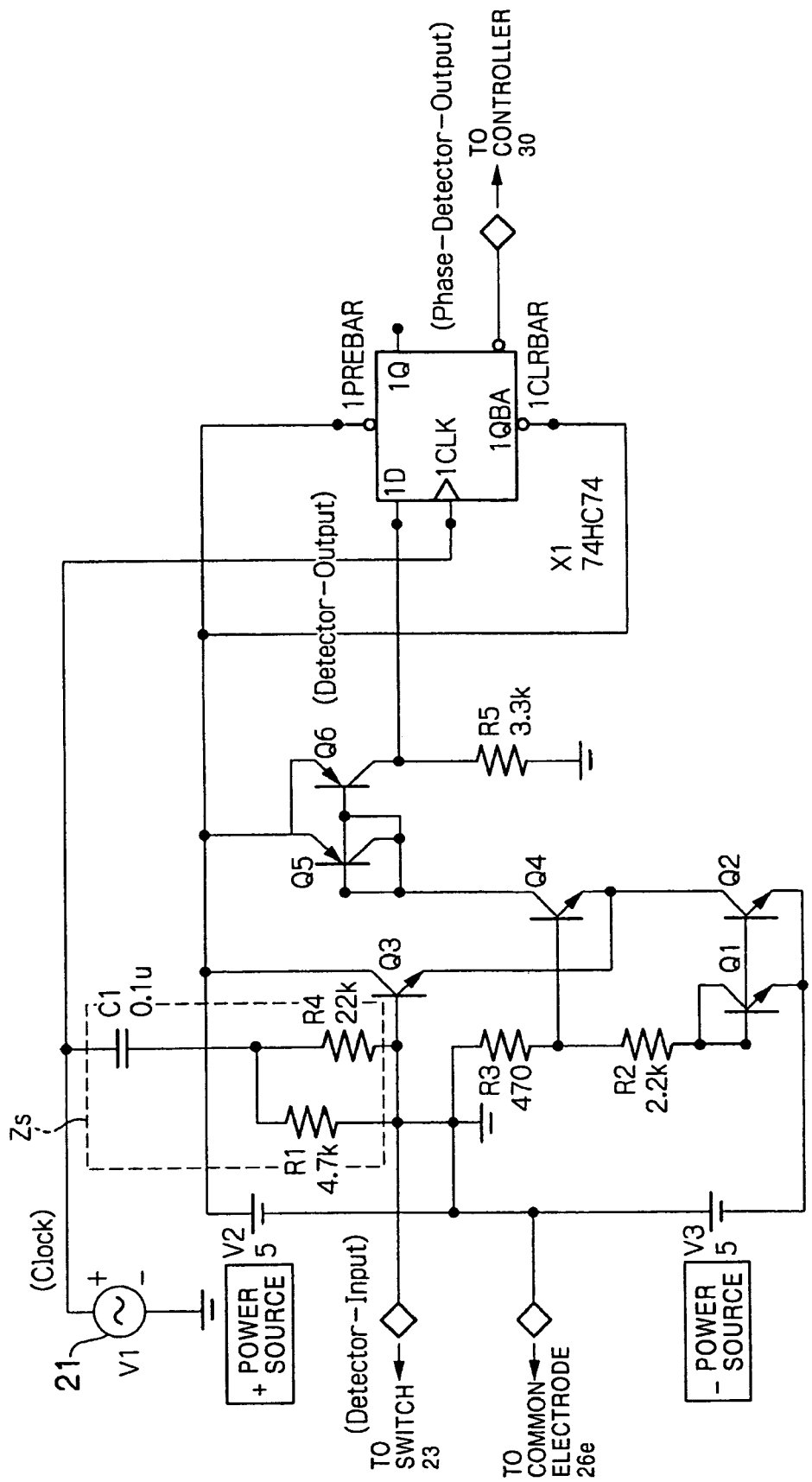
FIG. 6 is a diagram showing a liquid detecting circuit in the first embodiment.

Next, a specific circuit configuration of the liquid detecting circuit 20 will be described. FIG. 6 is a circuit diagram of the liquid detecting circuit 20 according to this embodiment.

An AC-signal source V1 (21) in this embodiment uses a signal having an amplitude of 0 to 5 V and a frequency of 250 kHz, which is used in a CMOS logic circuit.

A capacitor C1 removes the DC component in an AC signal fed from the AC-signal source V1. The capacitor C1 is grounded via a resistor R1 having a resistance of 4.7 kΩ. Furthermore, the capacitor C1 is connected to the switch 23 via a resistor R4 having a resistance of 22 kΩ. In this circuit diagram, an impedance network Zs is implemented by a T-shaped circuit formed by the capacitor C1 and the resistors R1 and R4.

Transistors Q1 and Q2, in combination with transistors Q3 and Q4, form differential amplifiers, which compare a signal detected by the detecting electrodes 26a to 26d connected to the base of the transistor Q3 with a threshold (nearly −1 V with this embodiment) preset at the base of the transistor Q4, thereby detecting change in the signal.

Furthermore, the arrangement is such that a current flows to the collector of the transistor Q4 only when the base potential of the transistor Q3 has dropped below that of the transistor Q4. Practically, a current flows only when the signal applied for detection is on the negative side and is lower than the threshold value (i.e., when the liquid is not in contact with the electrode units 26).

Transistors Q5 and Q6 cause a collector current of the transistor Q4 to be inverted and the inverted current to flow to the collector of the transistor Q6, whereby a voltage is generated across a resistor R5 having a resistance of 3.3 kΩ. A voltage is generated across the resistor R5 only when it is determined that the electrode units 26 are not in contact with the liquid.

With regard to the voltage generated across the resistor R5, the relationship between the collector current of the transistor Q6 and the resistor R5 is chosen so that the transistor Q6 can be saturated (at a maximum potential of approximately 5 V). Thus, when a voltage is generated across the resistor R5, a signal that is sufficient for detection by a DFF (D flip-flop) of a CMOS that performs next synchronous detection is fed to a D input terminal thereof.

The DFF receives, via a CLK input terminal thereof, a clock signal (detection signal) that is exactly the same as the AC signal described earlier, and carries out determination.

In FIG. 6, the AC signal output from the AC-signal source V1 and the input to the capacitor C1 and the clock signal input to the CLK input terminal of the DFF correspond to the signal represented by the waveform chart shown in part (A) of FIG. 5. The AC signal having passed through the capacitor C1, which does not include the DC component, correspond to the signal represented by the waveform chart shown in part (B) of FIG. 5.

The signal input from the electrode units 26 (Detector-Input) corresponds to the signal represented by the waveform chart shown in part (C) of FIG. 5. The signal fed to the D input terminal of the DFF (Detector-Output) corresponds to the signal represented by the waveform chart shown in part (D) of FIG. 5. The signal output from the DFF (Phase-Detector-Output) corresponds to the signal represented by the waveform chart shown in part (E) of FIG. 5.

Figure 7:
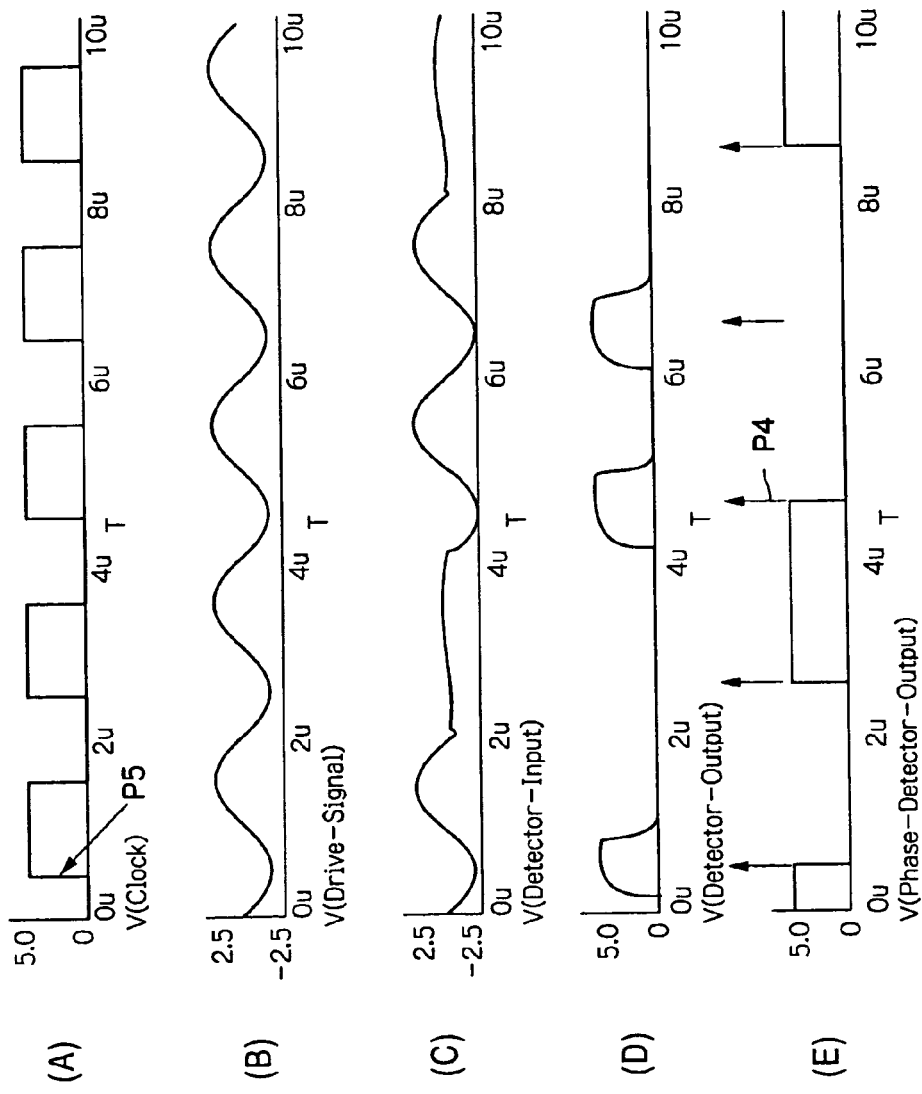
FIG. 7 is a waveform chart showing a second embodiment of the present invention, and it corresponds to FIG. 5 for the first embodiment.

Second Embodiment FIG. 7 is a waveform chart showing a second embodiment of the present invention, and it corresponds to FIG. 5 for the first embodiment.

In the first embodiment, the AC signal with a DC component having been removed therefrom is a rectangular wave; whereas in the second embodiment, a sine wave is used.

In FIG. 7, an original signal output from the AC-signal source 21 is a rectangular wave, as shown in part (A). This signal is converted, for example, through a low-pass filter, into a sine (or like) wave shown in part (B).

The signal shown in part (B) is obtained by converting a rectangular wave into a sine (or like) wave and removing a DC component from the sine wave. In part (A) of FIG. 7, as compared with part (A) of FIG. 5, the phase is shifted by ¼, as indicated by P5. Thus, the sine wave crosses 0 V at 1, 2, 3, . . . μsec.

Then, detection is performed when the clock signal rises (when the sine wave reaches a minimum level). The timing of detection is indicated by an arrow P4, as in FIG. 5.

In the case where a sine wave is used, as compared with the case where a rectangular wave is used, advantageously, the signal requires a narrower bandwidth, and therefore, the problem of undesired radiation can be alleviated. Furthermore, since the waveform is not considerably affected by the environment and conditions (because of the nature of the sine wave) during detection, detection can be performed appropriately even in a large-sized apparatus in which the distance to a detection point tend to be long. Furthermore, detection speed can be improved compared with the case where a rectangular wave is used because of a use of a higher clock frequency. However, as described earlier, the sine wave must be synchronized with the system.

It is also possible to use a low-pass filtered rectangular wave. In that case, the impedance (Zs) 22 is implemented by a low-pass filter and a resistor for adjusting impedance.

Third Embodiment

Figure 8:
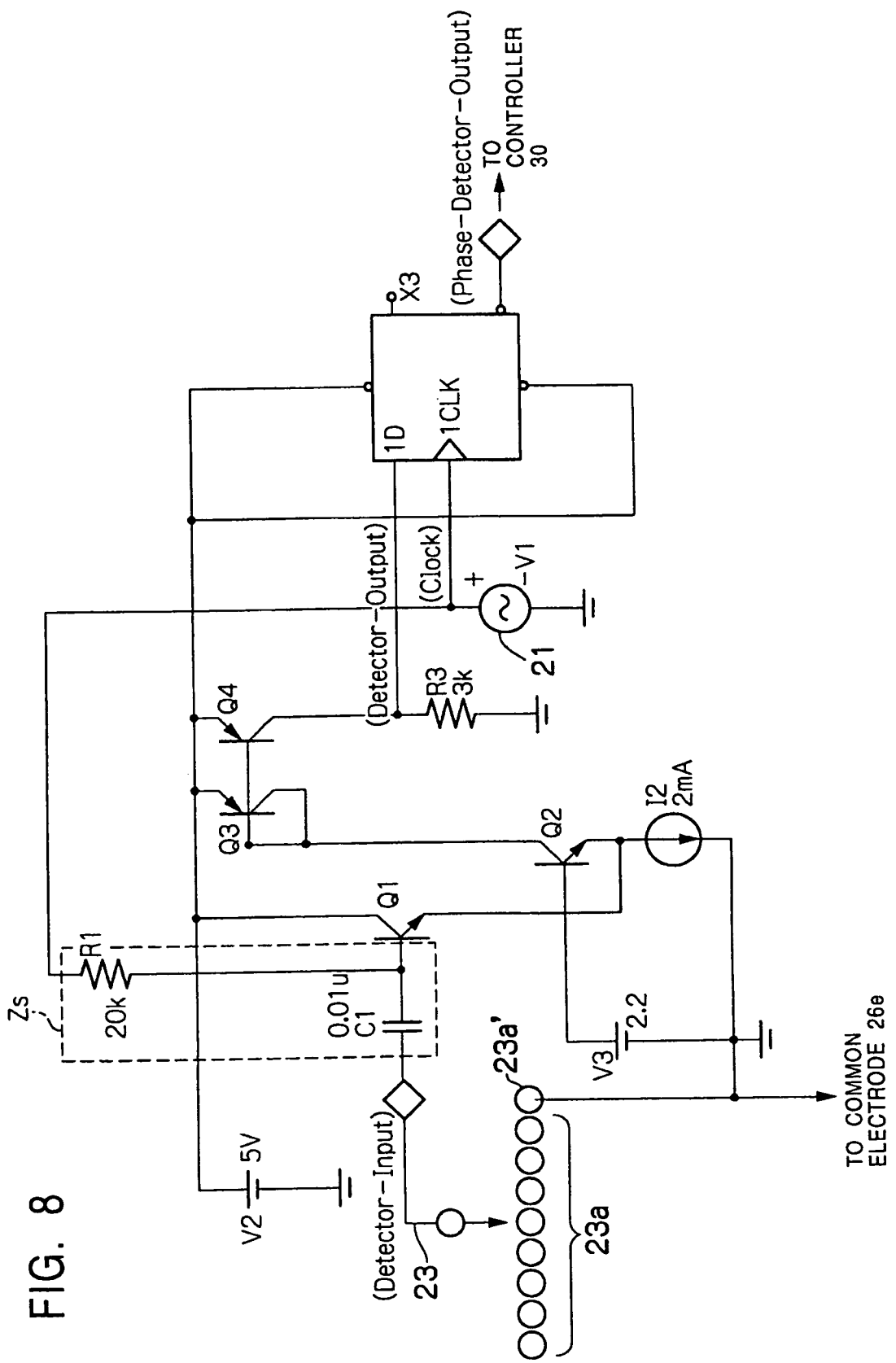
FIG. 8 is a diagram showing a third embodiment of the present invention, and it corresponds to FIG. 6 for the first embodiment.
Figure 9:
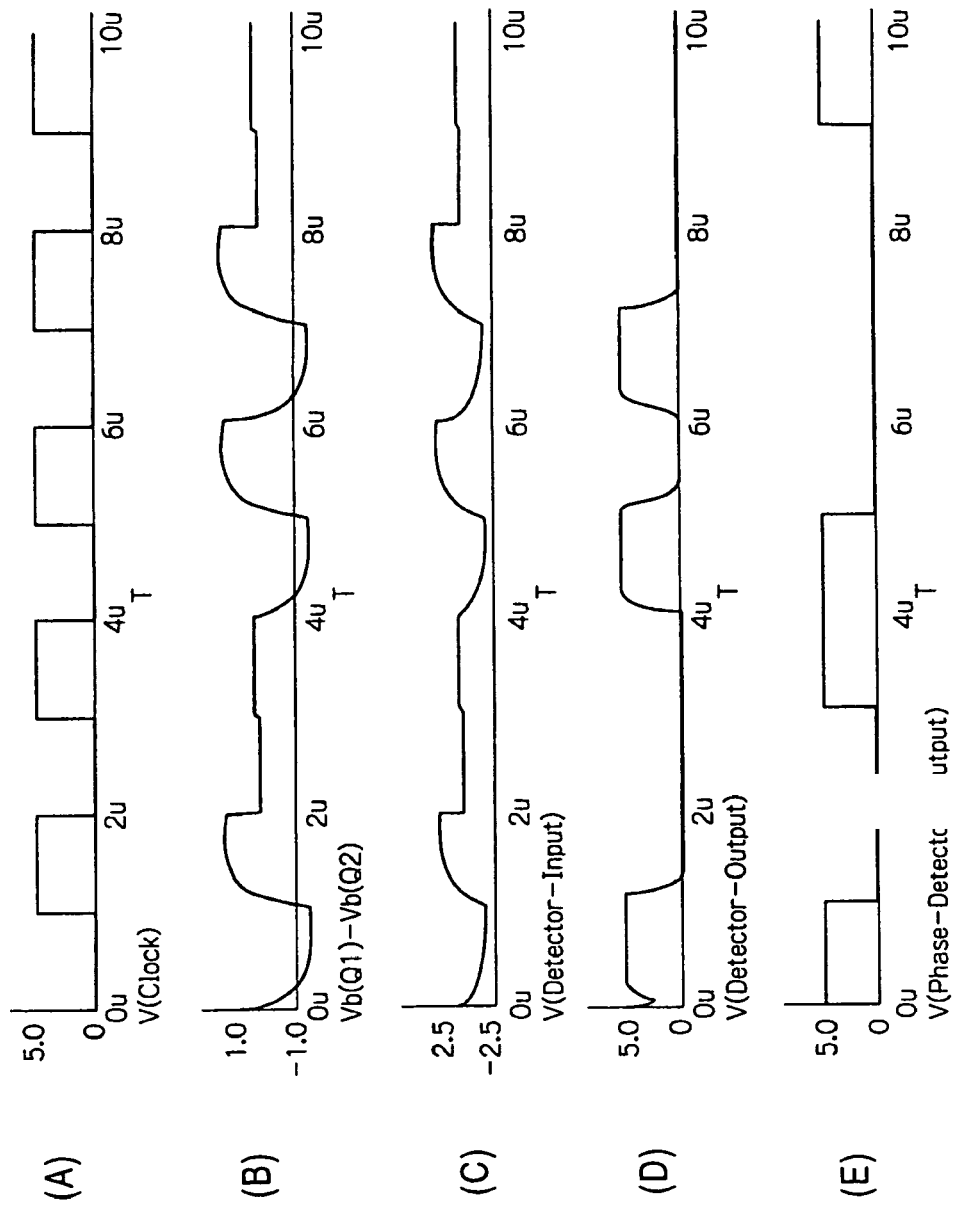
FIG. 9 is a waveform chart relating to the circuit diagram shown in FIG. 8, and it corresponds to FIG. 5 for the first embodiment.

FIG. 8 is a circuit diagram showing a third embodiment of the present invention, and it corresponds to FIG. 6 for the first embodiment. FIG. 9 is a waveform chart relating to the circuit diagram shown in FIG. 8, and it corresponds to FIG. 5 for the first embodiment.

In the first embodiment, power sources of ±5 V are required, as shown in FIG. 6. In contrast, in the third embodiment, only a power source V2 of +5 V suffices to achieve the same functions as the first embodiment.

In this circuit, the average voltage of measurement equals the DC component of the clock signal. Thus, if a 5 V power source is used, measurement is performed at 2.5 V or nearly as a center. For the purpose of comparison, a DC power source V3 of 2.2 V, connected to the base of the transistor Q2, is used.

Furthermore, although all the nodes 23a of the switch 23 are connected to the detecting electrodes 26a to 26d in the first embodiment, a node 23a' that is connected to the common electrode 26e and is thereby grounded is additionally provided in the third embodiment.

For example, when the power of the liquid detecting apparatus 10 is off, the switch 23 is selectively connected to the node 23a'.

For example, when the liquid detecting apparatus 10 is powered on or off, the node 23a' is selected, whereby the capacitor C1 is quickly charged or discharged without causing a current to flow through electrode units 26 that are in contact with the liquid. That is, immediately after the liquid detecting apparatus 10 is powered on or when the liquid detecting apparatus 10 is not in operation, a potential difference remains between each of the pairs of electrodes (between the detecting electrodes 26a to 26d and the common electrode 26e). The remaining potential difference is reduced as time elapses. However, if this is repeated many times, the electrolysis of the liquid could progress. Thus, in the third embodiment, in order to avoid this situation, the switch 23 is connected to the node 23a' while the system is not ready for measurement by the liquid detecting apparatus 10.

Fourth Embodiment

Figure 10:
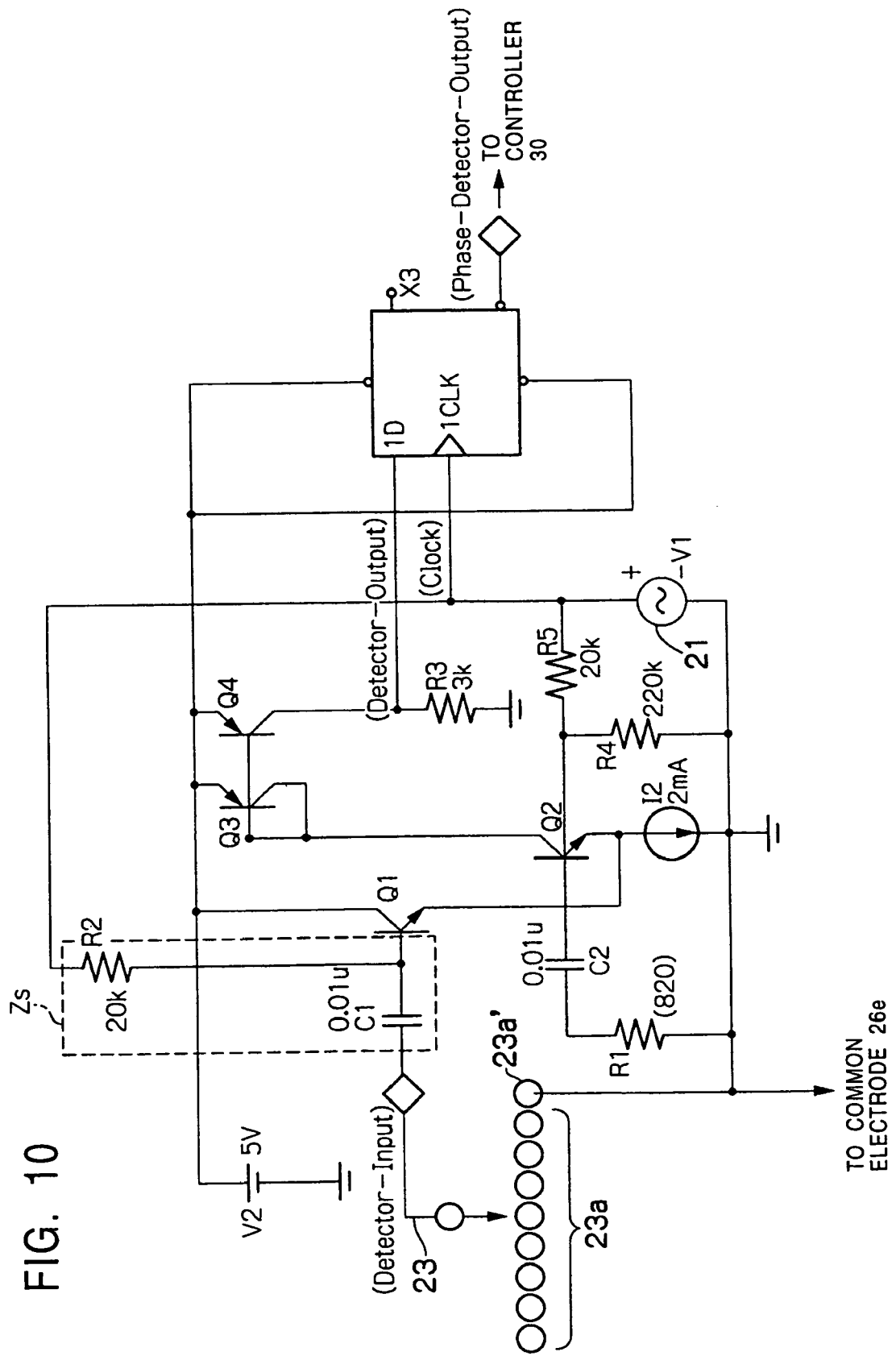
FIG. 10 is a circuit diagram showing a fourth embodiment of the present invention, and it corresponds to FIG. 6 for the first embodiment.
Figure 11:
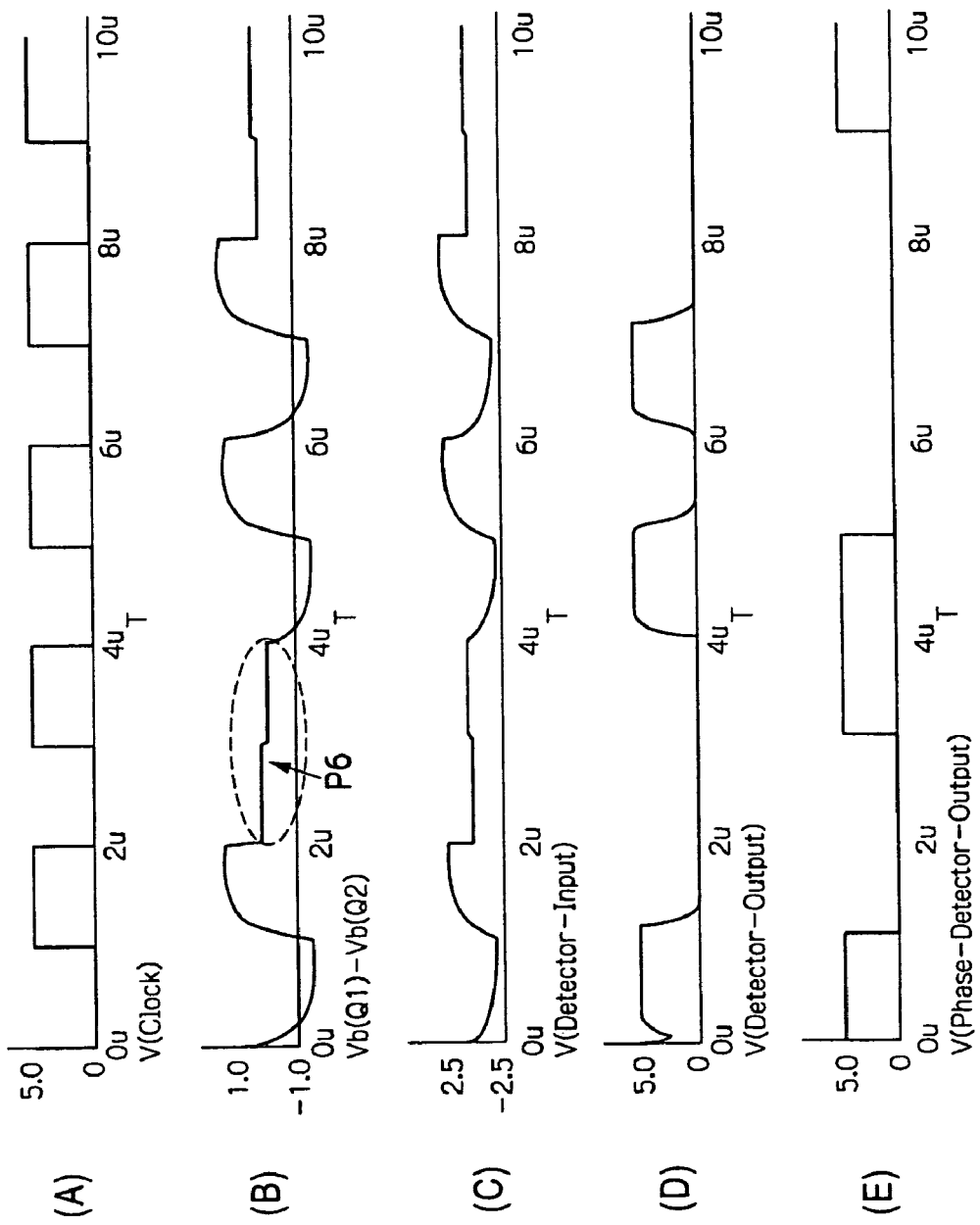
FIG. 11 is a waveform chart relating to the circuit diagram shown in FIG. 10, and it corresponds to FIG. 5 for the first embodiment.

FIG. 10 is a circuit diagram showing a fourth embodiment of the present invention, and it corresponds to FIG. 6 for the first embodiment. FIG. 11 is a waveform chart relating to the circuit shown in FIG. 10, and it corresponds to FIG. 5 for the first embodiment.

The circuit according to the fourth embodiment, similarly to the third embodiment, uses a single power source V2 of +5 V. In the third embodiment, the DC power source V3 of 2.2 V is used for comparison and detection. In contrast, in the fourth embodiment, a clock signal having passed through resistors R2 and R5, with a DC component maintained as it is, is applied equally to the bases of the transistors Q1 and Q2 serving as inputs to the threshold detecting unit 24, and a threshold detection is carried out at approximately one half of the power-supply voltage, i.e., at 2.5 V.

Furthermore, the base potential of the transistor Q1 must be maintained higher by the threshold value, that is, in this embodiment, detection must be performed using signals on one side of an intermediate level. Thus, the resistor R4 having a resistance of 220 kΩ is used for a slight voltage division, whereby the base potential of the transistor Q2 is lowered.

With the circuit configuration described above, stable detection is allowed even if the power-supply voltage fluctuates. Furthermore, the signal voltage remaining at the base of the transistor Q1 when the electrode units 26 are in contact with the liquid can be virtually equal to the signal voltage that is applied to the base of the transistor Q2, so that the output is hardly affected. That is, the S/N ratio of detection can be improved (the dynamic range can be increased).

In the waveform chart shown in FIG. 11, as will be understood from part (B) (Vb(Q1)-Vb(Q2)), the clock signal V (Detector-Input) that appears immediately below, which attenuates in accordance with the ratio of the resistance of the signal-source resistor R2 (20 kΩ) and the conduction resistance of the liquid as measured with an alternating current (assumed to be 500 Ω in this embodiment), can be virtually cancelled, as indicated by P6 enclosed in a dotted ellipse in part (B).

In principle, the value of the attenuated clock signal can be virtually cancelled if the total of the resistance of the switch 23 and the conduction resistance of the electrode units 26 in the liquid is equal to the resistance of the resistor R1 (820 Ω in this embodiment). Thus, it is possible to use a variable resistor for the resistor R1 to allow adjustment in accordance with an actual state.

The embodiments described above exhibits the following advantages:

(1) Since a complete cycle or several complete cycles of an AC current flows through the detecting electrodes 26a to 26d, liquid is prevented from ionization, serving to avoid change in liquid characteristics.

(2) Electric signals are processed separately from the containers T, and no DC current flows and only a weak AC current flows. Thus, the safety of a system that deals with aqueous liquid can be improved.

(3) Measurements at the individual electrode units 26 determine the presence or absence of electric connection instead of determining analog amounts. Thus, no adjustment is needed, reliability is improved, and the precision of measurement is determined only by the number of electrode units 26 provided.

(4) With the electrode units 26 provided for measurement, only one liquid detecting circuit 20 suffices. Thus, the liquid-amount detecting apparatus 10 can be implemented simply and inexpensively.

(5) Since conduction resistance is lower compared with DC detection, the area of the electrode units 26 can be made small. Thus, precise detection is allowed without occupying a large space, and a large number of electrode units 26 can be disposed.

(6) Since measurement can be performed quickly compared with DC detection, the speed of measurement and display as a whole can be improved.

(7) Since power consumption is small, even a battery-powered operation is possible.

(8) Since signals in the audio to the AM frequency band can be used, substantially no particular measure is required against undesired radiation.

(9) Since the operation of the single liquid detecting circuit 20 suffices constantly for all the detecting electrodes 26a to 26d, the effect of mutual cross-talks during observation and detection can be substantially eliminated.

(10) Since a container T has to contain only the electrode units 26, the structure of the container T can be simplified.

Although the present invention has been described in the context of specific embodiments, the present invention is not limited to the embodiments described herein, and various modifications are possible, including the following:

(1) The liquid-amount detecting apparatuses 10 according to the embodiments can be used in various apparatuses for detecting and/or displaying the presence or absence of various liquids or the remaining amount of thereof in various containers T, without limitation to detecting the remaining amount of ink in an ink-jet printer.

(2) In the embodiments described above, the remaining amount of liquid in a container T is represented by values of "0" to "4". Alternatively, four LEDs may be provided for each container T, indicating the remaining amount of liquid by turning the LEDs on or off. For example, when the liquid is detected by all the four electrode units 26, all the LEDs are turned on. If the liquid is detected by the lower three electrode units 26 but not by the uppermost electrode unit 26 (the detecting electrode 26a and the common electrode 26e), three LEDs are turned on and one LED is turned off. If the liquid is detected by none of the LEDs, all the LEDs are turned off.

(3) In the third and fourth embodiments, the node 23a' that is connected to the ground is provided as one of nodes of the switch 23. Alternatively, for example, the arrangement may be such that the switch 23 can be disconnected from all the nodes. That is, the arrangement may be arbitrary as long as the detecting electrodes 26a to 26d can be electrically disconnected.

(4) In the embodiments, the presence or absence of liquid is detected by all the electrode units 26. Alternatively, for example, detection may be sequentially performed in a single container T starting from the uppermost electrode unit 26 (the detecting electrode 26a and the common electrode 26e), skipping detection of the presence or absence of the liquid by electrode units 26 below an electrode unit 26 with which the presence of the liquid has been detected.

Furthermore, without limitation to detection of the presence or absence of liquid or the remaining amount of liquid in a container T, liquid in other parts can also be detected. For example, when the apparatus is used in an ink-jet printer, electrode units 26 may be provided in a chamber (ink pool) disposed at the immediate upstream of a printer head, detecting the presence or absence of ink in the chamber. Furthermore, in order to protect the printer head, it is possible to exercise control so as to stop printing if it is determined that ink is not present in the chamber.

(5) The impedance 22 for removing a DC component in a signal fed from the AC-signal source 21 can be implemented by various elements, for example, one or more capacitors or resistors, or a combination thereof. If the original signal generated by the AC-signal source 21 does not-include a DC component, the impedance 22 can be implemented only by a resistor. If a DC component needs to be removed, a capacitor is connected in series with a resistor.

(6) In the embodiments, a plurality of electrode units 26 is provided in a single container T to detect the remaining amount of liquid in the container T. Alternatively, for example, a single electrode unit 26 may be provided at the bottom of the container T to detect only the presence or absence of liquid.

According to the present invention, since a direct current does not flow through liquid, the characteristics of the liquid do not change. Furthermore, conduction resistance can be made small. Furthermore, detection speed can be increased.

Furthermore, since the presence or absence of liquid is determined by outputting a binary signal, digital processing is allowed, serving to improve the reliability of detection.

What is claimed is:

1. A liquid-amount detecting apparatus for detecting the amount of a liquid contained in at least one container, the liquid detecting apparatus comprising:

a liquid detecting circuit comprising an electrode unit formed by a pair of electrodes, the pair of electrodes being electrically connected to each other when the pair of electrodes is in contact with the liquid; and a signal source; wherein the liquid detecting circuit inputs a signal not containing a direct-current component to the electrode unit and outputs a signal representing status of electrical connection between the pair of electrodes, and means for determining a liquid level based on the presence or absence of the liquid at the electrode unit based on the signal output from the liquid detecting circuit, wherein at least one electrode unit is provided in each of a plurality of containers, and wherein signals representing status of electrical connection between the respective pairs of electrodes in the plurality of containers are generated.

2. A liquid-amount detecting apparatus for detecting the amount of a liquid contained in at least one container, the liquid detecting apparatus comprising: a liquid detecting circuit comprising an electrode unit formed by a pair of electrodes, the pair of electrodes being electrically connected to each other when the pair of electrodes is in contact with the liquid; and a signal source; wherein the liquid detecting circuit inputs a signal not containing a direct-current component to the electrode unit and outputs a signal representing status of electrical connection between the pair of electrodes, and means for determining a liquid level based on the presence or absence of the liquid at the electrode unit based on the signal output from the liquid detecting circuit, wherein the liquid detecting circuit is allowed to disconnect the signal source from a node of the electrode unit to which the signal is input from the signal source.

3. A liquid-amount detecting apparatus for detecting the amount of a liquid contained in at least one container, the liquid detecting apparatus comprising: a liquid detecting circuit comprising an electrode unit formed by a pair of electrodes, the pair of electrodes being electrically connected to each other when the pair of electrodes is in contact with the liquid; and a signal source; wherein the liquid detecting circuit inputs a signal not containing a direct-current component to the electrode unit and outputs a signal representing status of electrical connection between the pair of electrodes, and means for determining a liquid level based on the presence or absence of the liquid at the electrode unit based on the signal output from the liquid detecting circuit, wherein the liquid detecting circuit is allowed to disconnect the signal source from a node of the electrode unit to which the signal is input, and to thereby connect the signal source to a grounding point or a connection at certain potential.

* * * * *